United States Patent [19]
Sharp

[11] Patent Number: 5,816,426
[45] Date of Patent: *Oct. 6, 1998

[54] DOUBLE WALLED STORAGE TANK SYSTEMS

[76] Inventor: Bruce R. Sharp, 321 Ski Way Box 5867, Incline Village, Nev. 89450

[ * ] Notice: The term of this patent shall not extend beyond the expiration date of Pat. No. 5,553,734.

[21] Appl. No.: 708,797

[22] Filed: Sep. 9, 1996

Related U.S. Application Data

[63] Continuation-in-part of Ser. No. 298,615, Aug. 31, 1994, Pat. No. 5,553,734.

[51] Int. Cl.⁶ .................................................... B65D 90/04
[52] U.S. Cl. ...................... 220/62.19; 220/559; 220/590
[58] Field of Search .................................. 220/414, 589, 220/590, 588, 483, 62.19

[56] References Cited

U.S. PATENT DOCUMENTS

| | | | |
|---|---|---|---|
| 3,207,352 | 9/1965 | Reinhart, Jr. ............................. | 220/589 |
| 3,661,294 | 5/1972 | Pearson et al. .......................... | 220/590 |
| 3,851,786 | 12/1974 | Kaempen ................................ | 220/590 |
| 4,844,287 | 7/1989 | Long . | |
| 4,871,078 | 10/1989 | Sharp . | |
| 4,989,447 | 2/1991 | Gelin . | |
| 5,000,342 | 3/1991 | Sharp . | |
| 5,090,586 | 2/1992 | Mitchell ................................. | 220/590 |
| 5,227,208 | 7/1993 | Thongs, Jr. ............................. | 220/590 |
| 5,553,734 | 9/1996 | Sharp ..................................... | 220/414 |

Primary Examiner—Joseph M. Moy
Attorney, Agent, or Firm—Charles R. Wilson

[57] ABSTRACT

A double walled storage tank system has two closely associated discreet walls with a closed communication space therebetween. The system comprises (a) a tank having a main body side wall and attached end walls, (b) a continuous wall of a fibrous reinforced resinous material which substantially follows the contour of at least a portion of the tank and (c) an array of interlocking filament bundles disposed between the tank and the continuous wall. The array has a first face bonded to a tank wall and a second face bonded to the continuous wall. A mid-portion of the array is in a substantially unbonded state to create the closed communication space for leak detection purposes. The strength of the double walled storage tank system is substantially enhanced by the array securely bonded to both the tank wall and the continuous wall and by its own inherent tensile strength.

46 Claims, 9 Drawing Sheets

DOUBLE WALLED STORAGE TANK SYSTEMS

This is a continuation-in-part of Ser. No. 08/298,615, filed Aug. 31, 1994, "Double Walled Storage Tank Systems With Enhanced Wall Integrity", now U.S. Pat. No. 5,553,734.

This invention relates to a method of making double walled storage tank systems and the resultant tank systems. More particularly, the invention relates to underground and above ground double walled storage tank systems which have at least a portion of their walls held together in a manner which enhances wall integrity and allows detection of any leakage through a wall.

BACKGROUND OF THE INVENTION

In recent years there have been suggested improved methods of building double walled storage tanks used primarily for storing liquids. The double walled tanks are desired, and recently mandated, to ensure adequate containment of stored liquid. Leakage through one wall will not immediately cause an environmental problem since the second wall should then serve to contain it. However, to be effective, any wall damage sufficient enough to allow leakage must be detectable so that it can be remedied. It is important that means be provided between the double walls that will alert the owner/operator of the tank of any wall failure.

U.S. Pat. Nos. 4,561,292, 4,640,439, 4,644,627, 4,744,137, 4,780,946, 4,780,947 and 4,844,287 disclose double walled storage tank systems wherein means are used to maintain a spaced relationship between the walls of the tanks. The spaced relationship is needed for effective leak detection purposes. However, the spacing means suggested can require a separate time consuming step in properly positioning some specially constructed material on a tank wall prior to forming an outer tank wall. U.S. Pat. Nos. 4,859,262 and 4,871,078 disclose double walled storage tank systems which also use special materials, though the systems are more efficiently built.

U.S. Pat. Nos. 4,989,447 and 5,000,342 disclose still other double walled storage tank systems. A separating material is used between the walls of the disclosed systems to ensure leakage detection capability. The disclosed systems also recognize the advantage of structurally bonding or tieing the walls together for strengthening purposes. For example, U.S. Pat. No. 4,989,447 teaches the use of a porous material such as a needled non-woven fibrous material between the walls. A binder saturates the porous material so as to bond the fibers together and to the inner and outer walls of the tank system. The binder present in the porous material bonds the fibers together in a manner which permits wicking of any leakage. U.S. Pat. No. 5,000,342 uses a special separating material having spaced holes extending through it. Formation of an outer wall of the tank with a liquid uncured resinous material also fills the holes which upon cure forms resin attachment columns. The columns are attached at one end to the inner tank and at the other end to the outer wall. The latter described tank system in particular is economically feasible and provides an integrally strengthened tank system.

There has now been developed methods whereby new and used storage tanks can be provided with a secondary containment wall having a minimal closed communication space therebetween. The resultant double walled tank systems are capable of withstanding elevated pressure forces between the walls without suffering damage.

SUMMARY OF THE INVENTION

A double walled storage tank system has two closely associated discreet walls with a closed communication space therebetween. The system comprises (a) a tank having a main body side wall and attached end walls, (b) a continuous wall of a resinous material optionally containing a fibrous reinforcing material which substantially follows the contour of at least a portion of the tank and (c) an array of interlocking filament bundles disposed between the tank and the continuous wall. A first face of the array is bonded to a tank wall and a second face thereof is bonded to the continuous wall. A mid-portion of the array is in a substantially unbonded state to create a closed communication space between the walls. Any leakage of the tank wall or of the continuous wall will be detectable in the closed communication space. The space between the walls is able to withstand substantial pressures without incurring damage. The use of the array of interlocking filament bundles is an improved technique for holding tank walls together while maintaining the closed communication space therebetween. The design is useful in building new tanks and retrofitting existing buried tanks.

DETAILED DESCRIPTION OF THE INVENTION

While the description to follow describes the invention in terms of its use with storage tanks for holding gasoline, it should be understood the invention has applicability for other uses as well. The invention lends itself particularly well to underground storage tanks for storing liquid gasoline and, therefore, this preferred use is described in the immediately following paragraphs. An above ground tank utilizing the invention is described with reference to FIG. 20.

Single wall storage tanks which are well known and have been widely used can be utilized in forming the double walled storage tank systems of the invention. The single wall tanks are typically made of metal or a fibrous reinforced resinous material. Either type of tank has use in this invention. In accord with this invention, the single wall storage tank has a continuous wall formed on either its outside surface or its inside surface. The continuous wall can cover only portions of the storage tank or can cover substantially the full storage tank in accord with special needs as described below and shown in the drawings.

Formation of the continuous wall on the inside surface of a tank is a technique which is particularly beneficial in retrofitting existing buried single wall tanks. The interior of such tanks can be accessed, cleaned and upgraded to a double walled tank system. Existing buried double walled tanks where the exterior wall has failed are also retrofitted by the method of the invention. The buried single wall and double walled tanks in need of repair do not have to be removed from the ground with consequent costs and station down-time. Rather they are upgraded in place.

With reference to FIGS. 1–4, a double walled storage tank system 10 of this invention utilizes a single wall ribbed storage tank 11 made of a fibrous reinforced resinous material. As evident in FIGS. 1 and 2, the tank 11 is cylindrical-shaped with a main body side wall 12, dome-shaped end walls 13 and circumferentially extending support ribs 14. The support ribs 14 are preferably uniformly spaced along the main body side wall 12 as shown. A single rib which wraps around the main body side wall of the tank in a spiral pattern is also feasible and provides some manufacturing advantages. Sufficient openings can be created in the storage tank 11 to allow for various access lines to communicate with the interior of the tank. As shown, the storage tank 11 has a manway 15 with a removable rigid plate cover 16. The cover 16 can have bungs for receiving access lines. For example, a conventional fill pipe, dispensing line and vent pipe can enter the storage tank 11 through the cover 16.

Figure 1:
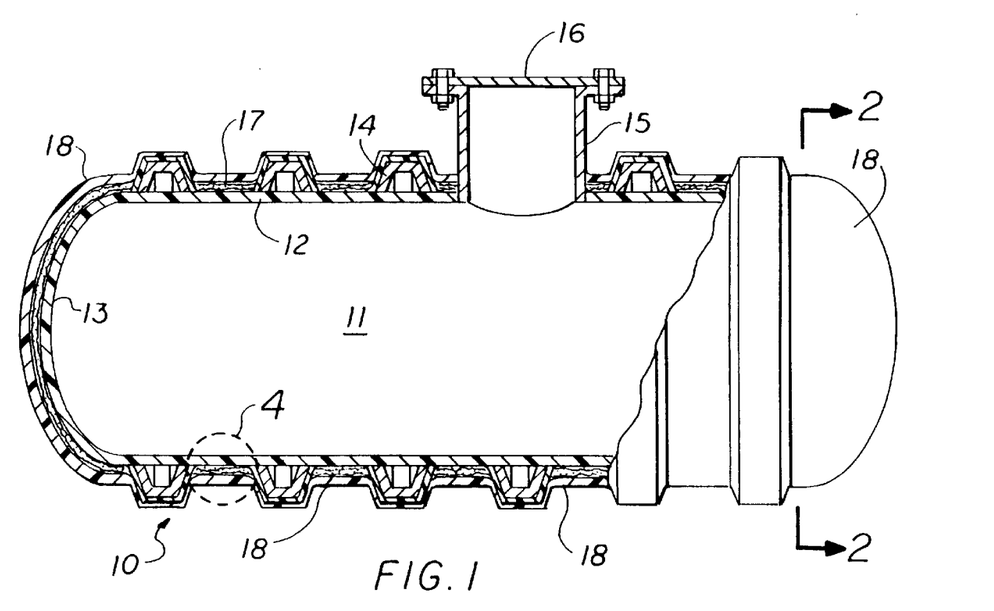
FIG. 1 is a side view in partial section of a double walled storage tank system of the invention having a ribbed inner tank of fibrous reinforced resinous material and a continuous wall of fibrous reinforced resinous material thereover with an array of interlocking filament bundles between the inner tank and continuous wall.

The illustrated double walled storage tank system 10 also comprises a set of arrays of interlocking filament bundles 17 which are positioned over a portion of the storage tank 11. Each array is positioned over the main body side wall 12 in recessed areas between support ribs and over the end walls 13 of the storage tank 11. The arrays 17 and an overlying continuous wall 18 as well as their modes of application are described in detail in the following paragraphs.

Figure 3:
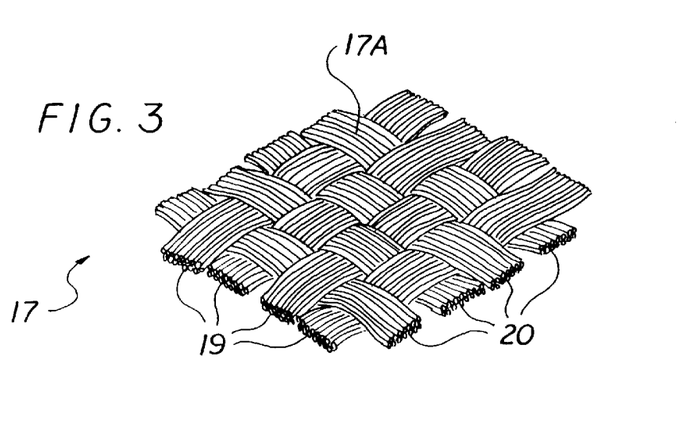
FIG. 3 is a perspective view of an array of interlocking filament bundles used in construction of the double walled storage tank system of FIG. 1.
Figure 6:
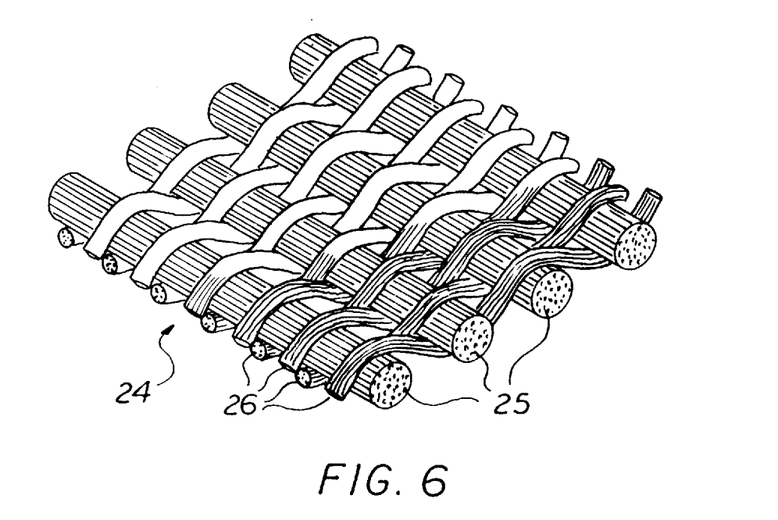
FIG. 6 is a perspective view of another array of interlocking filament bundles used in the double walled storage tank system of the invention.
Figure 7:
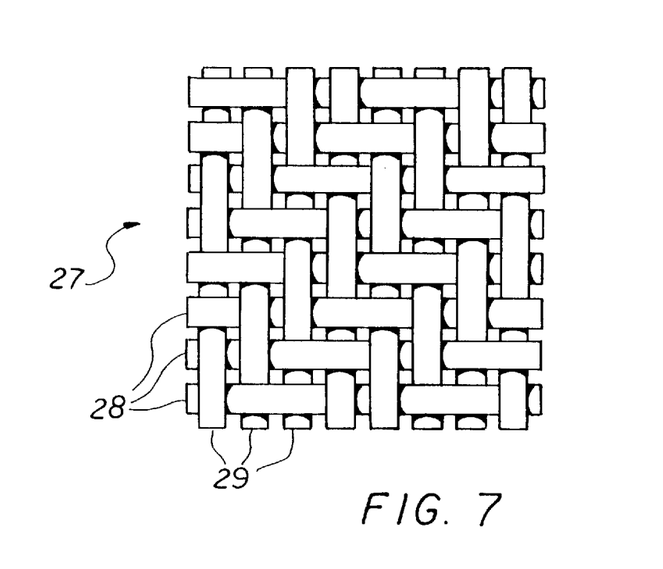
FIG. 7 is a top view of still another array of interlocking filament bundles used in the double walled storage tank system of the invention.

Arrays used in this invention are comprised of bundles of filaments that are formed together in an interlocking manner whereby a top face, a bottom face and a mid-portion are created and as best seen in FIGS. 3, 6 and 7. Each bundle in the array has several continuous filaments which are preferably discreet filaments loosely held together as tows. The individual filaments can be loosely twisted together to form a full bundle. The individual filaments can as well additionally be loosely twisted together to form several filament yarns which are then formed into the bundles.

The individual filaments of most interest because of long lasting strength are manufactured filaments made from polymeric synthetic resins or glass. Examples of suitable filaments used to form the bundles include acrylic, nylon, polyester, rayon, acetate, triacetate, olefin and glass filaments. Such filaments are preferably substantially inelastic. Preferably, the filaments have denier's, i.e. diameters of from about 3.5 microns to about 24 microns. The filaments are also made from natural fibers such as cotton and wool, though are less preferred because of their ability to absorb moisture and deteriorate over time. The preferred manufactured filaments are more durable. Highly preferred are fiberglass filaments because of their strength characteristics.

The width and thickness of each individual filament bundle vary widely. Preferred filament bundles used in the invention are about 2 mm to about 12 mm, preferably about 4 mm to about 8 mm in width and about 2 mm to about 12 mm, more preferably about 2 mm to about 5 mm in thickness. Arrays of the bundles typically have yields of from about 8 oz. per square yard to about 54 oz. per square yard. A preferred array of filament bundles is formed from fiberglass and has a yield of from about 24 oz. per square yard to about 48 oz. per square yard.

The aforementioned bundles of filaments are woven together by interlacing sets of bundles at right angles to other sets of bundles. The lengthwise filament bundles are commonly referred to as warp bundles while the crosswise filament bundles are commonly referred to as filling bundles. The filling bundles pass over and under the warp bundles to form an array of interlocking filament bundles. Preferably, the individual filling and warp filament bundles are approximately the same in filament type, filament denier and filament count. However, the filament bundles can be different in one or more of the aforementioned characteristics for cost advantage or performance advantage reasons.

Different arrays of filament bundles are useful in the invention. A common array which is preferred is a "basket weave" array wherein filling bundles pass over and under an equal number of warp bundles. FIG. 3 illustrates such an array. Other arrays which are useful are "rib weave", "twill weave", and "satan weave" arrays. FIGS. 6 and 7 illustrate the rib weave and the twill weave, respectively, and are discussed in further detail below. Such arrays are utilized, though provide no meaningful benefit over the conventional basket weave array and, accordingly are less preferred.

Each array 17 used in forming the double walled storage tank system 10 shown in FIG. 1 is in the form of a continuous sheet having a width about equal to the distance between support ribs. It can as well be in the form of several strips of sheet material which are abutted side by side on the tank's surface between support ribs. As best seen in FIG. 3, the array 17 is a basket weave array. Each bundle has a width of about 8 mm and a thickness of about 2 mm. The array's total thickness is about 4 mm and its yield is about 24 oz. per square yard. It should be understood, tighter or looser individual bundles of filaments can be formed and tighter or looser arrays of bundles can be formed with consequent changes in width, thickness, and weight. A balancing of enhanced performance and costs is readily performed to determine an optimum array for the particular tank requirements.

Figure 4:
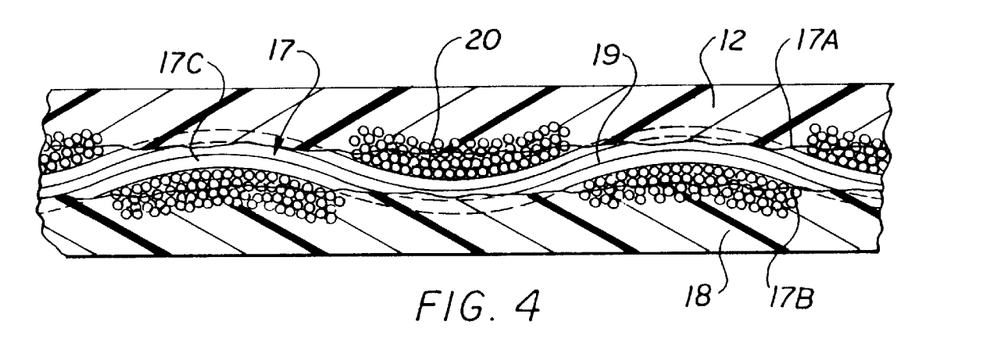
FIG. 4 is an enlarged partial side view in section of the double walled storage tank system of FIG. 1 taken along line 4—4 thereof showing the array of interlocking filament bundles between its walls.

One purpose of the array is to ensure that a subsequently applied resinous material used in forming the continuous wall of the storage tank system does not fully bond directly to the storage tank walls. Another purpose of the array is to structurally hold the walls together. To accomplish these objectives, it is important that the density of the array of interlocking filament bundles and the viscosity of the liquid resinous material used in forming the continuous wall be coordinated so that total resin penetration through the array is avoided. With reference to FIG. 4, a first face 17a of the array 17 is embedded in the surface of the side wall 12 and a second face 17b of the array is embedded in the adjacent continuous wall 18. For these purposes, it should be understood that the term "wall" is us ed in the context of the array face being encompassed by either a wall per se or a surface of a discreet material applied and adhered to a surface of an existing wall so as to become a permanent part thereof. For example, a metal tank wall as discussed below with reference to FIGS. 13 and 14 will typically first be given a surface preparation to enhance bonding. Next, a discreet surface application of a resinous material is applied and bonded to the metal. The array face is embedded in the resinous material.

A mid-portion 17c of the array 17 of interlocking filament bundles forming a part of the double walled storage tank system 10 of FIG. 1 is substantially unbonded and serves as a closed communication space between the cured continuous wall 18 and the storage tank side wall 12 and end walls 13. Such space is closed and provides a path whereby any leakage of liquid or air can be detected. A portion of the space is annular as evident in FIG. 2. The outer continuous wall and the main body side wall are held together due to each face of the array of interlocking filament bundles being embedded in a respective wall. Each of the several bundles crosses from one wall to another wall. At the same time, each of the several bundles is criss-crossing with other bundles. The result is that the tank walls are held together by the several bundles working in concert. The tank construction together with the nature of the interlocking filament bundles prevents any substantial separation of one wall away from another wall. Pressures between the walls can be much greater than heretofore experienced in known double walled tanks without damage.

Figure 2:
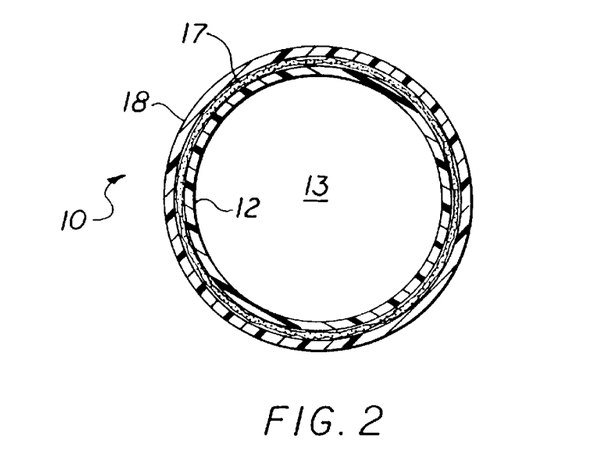
FIG. 2 is an end view of the double walled storage tank system of FIG. 1 taken along line 2—2 thereof.

The storage tank 11 depicted in FIGS. 1, 2 and 4 is built in an efficient manner. Initially, in one manner of building, the side wall 12 in the recessed areas between support ribs and the end walls 13 are substantially coated with a resinous material which will adhere to the tank walls and which is gasoline resistant. Examples of such resins include polyesters, vinylesters, polyurethanes and polyepoxides. Other resins are available and can be used. As aforementioned, the liquid resinous material's viscosity prior to application is adjusted to be viscous and somewhat non-flowable, yet remains tacky sufficiently long to position the individual arrays 17 of interlocking bundles onto it. Additionally, the coating thickness of the resinous material is controlled so that the coating does not fully penetrate through the subsequently applied array. A resin penetration through the array's first face of up to about 60% of the array's thickness used with a penetration of from about 10% to about 40% of array thickness being preferred.

Once the arrays 17 of filament bundles are positioned on the aforedescribed resinous coated storage tank 11 and embedded therein in a cured state, the continuous wall 18 is formed over the arrays. Initially, more resinous material of preferably the same nature as that on the tank's surface is applied to the array's second face 17b. Its viscosity is adjusted to also result in only partial penetration. Preferably, the resin penetrates through the array's second face also up to about 60% of the array's thickness, preferably about 10% to about 40% into the array's thickness.

Most importantly, the resin's penetration through the array's first face 17a and its penetration through the array's second face 17b are such as to leave the mid-portion 17c of the array in a substantially unbonded state. This ensures the continuous closed communication space which is needed for leak detection purposes. In total, the resin penetrates from both sides, though not necessarily equally, so as to saturate up to about 98% of the array's thickness. At least about 2% of the array's mid-portion is in the substantially unbonded state.

Alternatively, in another manner of tank building, the array is separately wetted with resinous material and then rolled onto the storage tank 11. The resin wetting is controlled to obtain the above resin penetration and, most importantly, substantially unbonded state in the array's mid-portion.

The balance of the outer continuous wall 18 which is formed over the partial resin impregnated array 17 is preferably fibrous reinforced, though can be added resinous material alone, up to a desired wall thickness. The continuous wall 18 preferably overlaps onto the side walls of the support ribs and more preferably, as shown, covers the top surface of the support ribs.

The fibrous reinforcing material when used in formation of the continuous wall can take on many different physical shapes and structures variously referred to as mattings, nets, screens, meshes and chopped strands. Examples of fibrous materials commonly used in the FRP industry include fiberglass, polyester, and other synthetic fibrous materials. The fibrous material, if in a sheet form, is laid onto the partial resin impregnated array of bundles as a continuous matting. Once the fibrous reinforcing material is applied, more resinous material is next applied to the reinforcing material and thereafter cured. Several different resinous materials are known for this purpose. Such resinous materials include polyesters, e.g. vinylesters, isophthalic polyesters, polyethylene, polyurethane and polyepoxide. The listed resinous and fibrous reinforcing materials used in the construction of this continuous wall are not all inclusive, but only illustrative of some of the materials which can be used. The particular selection of a fibrous material or a resinous material can be dependent on the other material selected and also on the manner of tank building as known to those in the FRP industry.

Alternatively and preferably, the continuous wall 18 is formed by applying the fibrous material in the form of chopped strands with the resinous materials described in the previous paragraph. That is, the chopped strand and resinous material are sprayed from separate nozzles of the same spray gun and the continuous wall formed therefrom directly on the arrays of filament bundles or on the partially resin impregnated arrays. Trapped air is preferably forced from the formed wall prior to cure. Cure of the resinous material results in a rigid continuous wall capable of containing leaked gasoline should the storage tank wall be damaged. Other known methods of forming a fibrous reinforced resin substance can be used. The shape of the resultant continuous wall 18 is such that, other than the manway 15 and any piping accesses, it covers the main body side wall, including at least the side walls of the support ribs, and end walls of the storage tank 11 and follows its contour to form a liquid-tight closed space between the walls.

The double walled storage tank system has sufficient structural integrity to withstand external and internal load forces normally encountered by underground storage tanks without suffering significant cracking or collapsing. The arrays of interlocking filament bundles embedded in the tank wall and in the continuous wall is responsible for the walls remaining held together even when elevated internal pressures between the walls is experienced.

The closed communication space between the continuous wall and the storage tank can be monitored. The full tank system can be monitored. Alternatively, selected tank system areas such as within support ribs, end wall areas or side wall areas can be individually monitored if desired. For example, an access tube extends from ground level through the continuous wall so as to be in communication with the closed space. Reference is made to U.S. Pat. No. 4,936,705, Column 3, line 11 through Column 4, line 41, the disclosure of which is hereby incorporated by reference, wherein a reservoir positioned on the storage tank system is in communication with the closed space. The closed communication space is filled with a detecting liquid. This detecting liquid can be placed in the closed space by the manufacturer of the tank. At the end of the access tube is a sight glass. Whenever leakage occurs, a change in the level of a detecting liquid will occur and will be readily 15 observed in the sight glass. Instead of the sight glass and visual observation of a change in level of detecting liquid, and in fact more preferably non-visual leak detection means, including pressure transducers and float controls are used to detect an up or down change in level. Any of well known and commercially available monitor means can be used.

Alternatively, the closed communication space between the walls of the double walled storage tank system is placed either under a non-atmospheric pressure, i.e. a positive or negative air pressure. Detection means associated with the closed communication space is capable of detecting any change in pressure resulting from the leak in the continuous wall or the storage tank. A conventional air pump or vacuum pump, together with an associated pressure regulator can be used. A pressure change sensor is a part of the detection means. A pressure gauge serves this purpose adequately. Optionally, an alarm system is electronically linked with the pressure sensor to audibly or visually warn of a pre-set significant pressure change. The volume of the closed communication space remains substantially constant and is conducive to the use of pressure or vacuum.

Another embodiment of the detection means utilizes an analyzer capable of detecting the liquid being stored. Thus, the detection means comprises the analyzer which is in communication with the closed communication space. A vacuum means for with drawing gaseous material from the closed space is used for the purpose of obtaining a sample. Still another detection means utilizes a probe which extends through an access tube so as to monitor for leakage, preferably at or near the bottom of the closed space. The probe is capable of detecting pre-selected liquids or gases.

Figure 5:
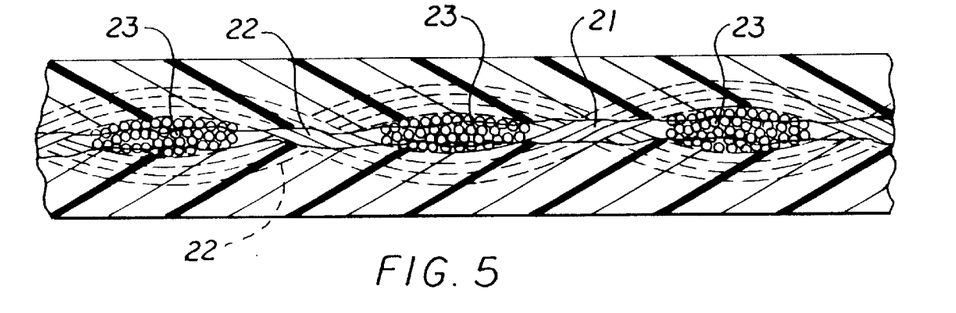
FIG. 5 is an enlarged partial side view in section of another double walled storage tank system of the invention showing the use of a more loose array of interlocking filament bundles between its walls.

FIG. 5 illustrates a double walled storage tank system of the invention wherein a loose array 21 of interlocking filament bundles is used. As evident, the individual warp and filling bundles 22 and 23, respectively, in the array 21 are spaced further apart than in the array 17. This allows greater resin penetration when the tank system is formed. A savings in the array's cost is achieved. However, greater care must be taken to ensure against complete resin penetration with no unbonded portion to create the communication 25 space for leak detection purposes.

FIGS. 6 and 7 illustrate other arrays of interlocking filament bundles which are used in the double walled storage tank systems of the invention. The array 24 shown in FIG. 6 is an interlocking "rib weave". The filling bundles 25 are larger in diameter than the warp bundles 26. The array 27 of FIG. 7 is an interlocking "twill weave". Twill weaves are characterized in having filling bundles 28 which pass across two or more warp bundles 48 before passing under two or more warp bundles 29 again. Each filling bundle passes under a warp bundle to the right or left of the preceding interlacing.

Figure 8:
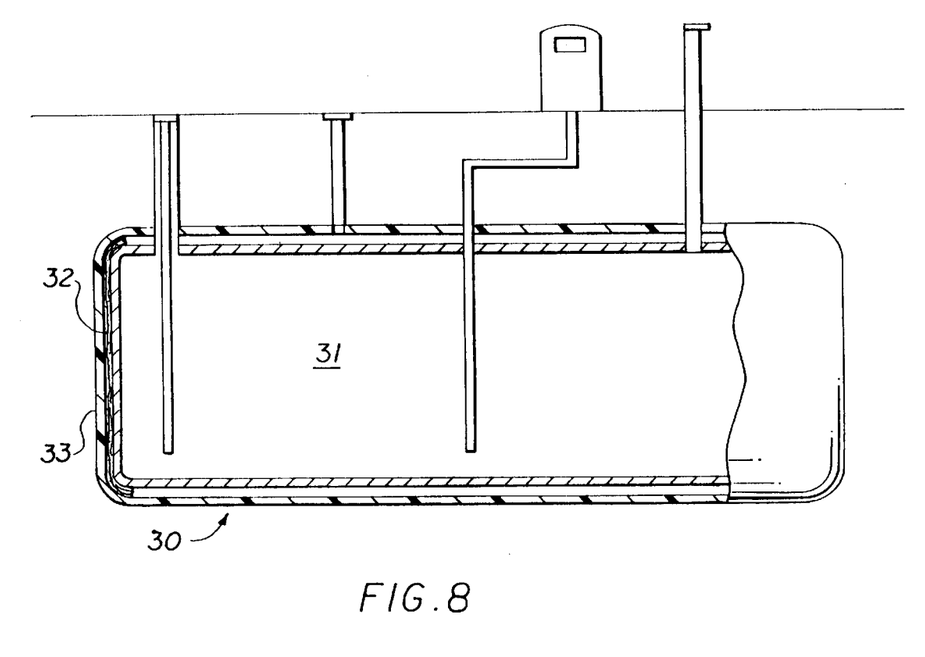
FIG. 8 is a side view in partial section of a double walled storage tank system of the invention having a steel inner tank and outer fibrous reinforced resinous material continuous walls over the inner tank's end walls and side wall with an array of interlocking filament bundles disposed in the end wall areas for enhanced end wall strength and a separating material in the side wall area for wall separation purposes.
Figure 10:
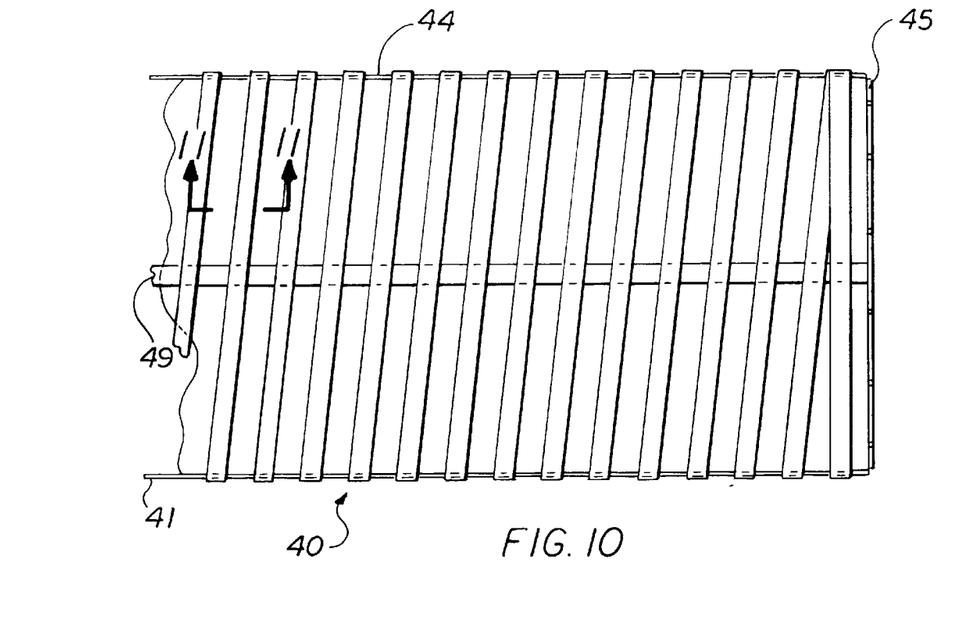
FIG. 10 is a side view in partial section of another double walled storage tank system of the invention wherein an inner tank has an array of interlocking filament bundles bonded thereto in a pattern and outer continuous wall is formed thereover such that the walls are held together in an intermittent manner.
Figure 11:
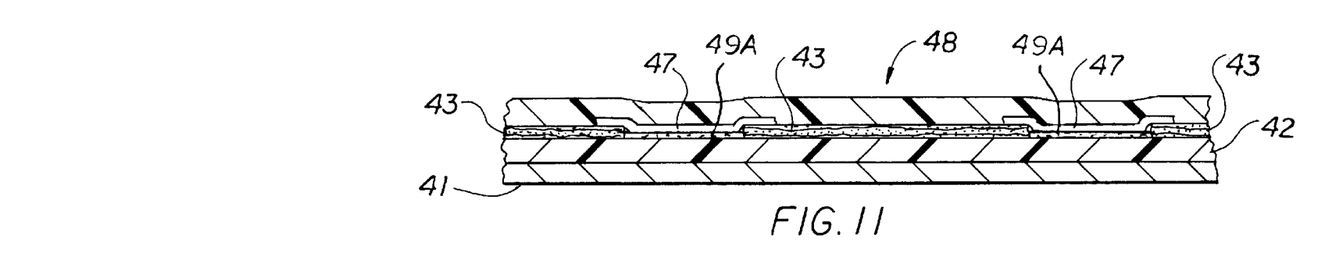
FIG. 11 is an enlarged partial side view in section of the double walled storage tank system of FIG. 10 taken along line 11—11 thereof.
Figure 12:
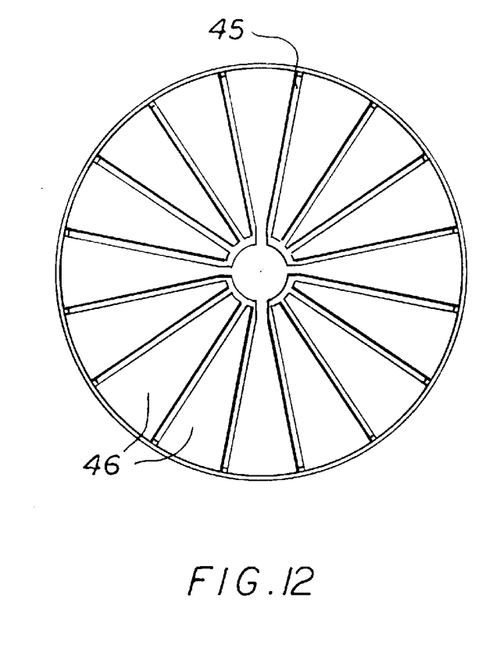
FIG. 12 is an end view of the double walled storage tank system of FIG. 10.

FIG. 8 illustrates an embodiment of the invention wherein an array of interlocking filament bundles is used only on the end walls of a storage tank forming a part of a double walled storage tank system 30. As shown, the inner storage tank 31 is a conventional metal storage tank made from steel. Steel storage tanks are often built with flatten end walls. These end walls can experience greater load forces than the main body side wall of the tank e.g. when the closed space between the walls is filled with detection liquid or air pressure by the manufacturer at the factory. Accordingly, it is particularly advantageous that the strength of the end walls be enhanced. An array 32 is positioned on each of the end walls to cover them. The coverage can be full or partial. Thereafter, a continuous wall 33 is formed over the end walls in the manner described above. Preferably, the continuous wall 33 also extends over the cylindrical-shaped main body side wall of the tank 31 such that full secondary containment of the inner storage tank is provided. An array of interlocking filament bundles can also be used between the side wall of the inner tank and the continuous wall. Alternatively, as shown, a conventional separating material such as a polymeric foam or another separating material as further described below with reference to FIGS. 10–12 is used between the side wall of the inner tank 31 and the continuous wall 33. This embodiment of the invention is important in holding the end walls together, thereby enhancing the end wall strength of the double walled storage tank system 30.

Figure 9:
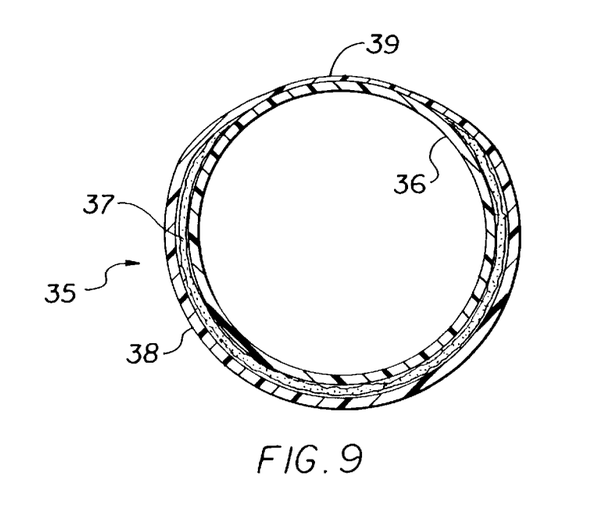
FIG. 9 is a side view of another double walled storage tank system of the invention wherein a continuous wall provides coverage of a lower portion of an inner tank.

A lower portion only of a conventional steel or fibrous reinforced resinous tank wall can have the array and continuous wall applied to effect a partial covering. With regard to FIG. 9, a double walled storage tank system 35 of the invention is shown wherein a continuous wall with the array thereunder covers only a portion of an inner tank. The inner tank 36 is made of fibrous reinforced resinous material and is ribbed. An array of interlocking filament bundles 37 covers only a lower portion of the inner tank 36, i.e. it provides about 270 degrees to about 340 degrees coverage. A continuous wall 38 is formed over the array 37 in the manner above described. Excess resinous material used in forming the continuous wall 38 can overlap onto the top portion of the inner tank 36. The single wall top center-line area 39 of the tank system is used for piping accesses.

With references to FIGS. 10–12, another double walled storage tank system 40 of the invention is made with the use of an array of interlocking filament bundles. The inner storage tank 41 is the same as described above with reference to FIG. 8. Initially, resinous material 42 is applied to the tank 41, at least in those areas where the array is to be positioned. While still tacky, a strip of the array 43 is wound in a spiral pattern of prescribed width around the cylindrical-shaped main body side wall 44 and bonded thereto. End walls 45 of the tank 41 also have the array 46 positioned and bonded thereto in a preferred spaced pie-shaped pattern as shown. Thereafter, a separating material 47 is preferably placed over the inner tank 41 in those areas not covered by the arrays. As shown, the separating material 47 overlaps the array 46. The array could as well overlap the separating material or they could be laid so as to abut together.

Separating materials used in building the tank system 40 include solid polymeric films, corrugated strips and foraminous or porous materials which are preferably sealed on at least one side. Many pliable or semi-rigid materials are usable. Examples of such materials are polyethylene, polyacetate and Mylar films, jute, polyurethane foam, polyester foam, polyether foam, fiberglass matting, cotton matting, nylon matting, corrugated cardboard, waxed surface paper and other fibrous sheets which range from about 0.01 inches to almost ½ inch in thickness. The Mylar film is preferred 20 because of its ease of use and performance attributes. A heat seal or sealing material, e.g. a polymeric coating, or a impervious wrapping such as polyethylene sheeting is used on one surface of any foraminous or porous materials when needed to prevent substantial saturation with a subsequently applied resinous material. The thickness and nature of the separating material must be sufficient to prevent the subsequently applied overlying portions of the continuous wall from bonding directly to the tank.

The width of the strip of array ranges from about 1 inch to about 18 inches. The preferred width of a strip is from about 4 inches to about 8 inches. Space between the array strips ranges from about one-half inch to about 18 inches, preferably about 2 inches to about 12 inches. The preferred widths and spacing varies based on structural design and size of the tank. The aforementioned preferred widths are for a storage tank having a diameter of from about four feet to about twelve feet.

A continuous wall 48 of resinous material is next formed over the discreet array and separating material areas in a manner above described. An unbonded mid-portion of the strip of array is a closed communication space which extends the full length of the main body of the tank and is in communication with the closed communication spaces formed in the end wall areas. To enhance communication, an intersecting cross flow channel 49 is preferably provided on the tank system by initially positioning at least one horizontal strip of array or porous separating material along the main body side wall 44 of the tank 41 the full length thereof. Even better leak detection capability is achieved when flow channels 49(a) are created between the resinous material 42 and the separating material 47 as shown in FIG. 11. A porous material is useful in creating the flow channels.

Other tank constructions and designs not illustrated are possible with the aforedescribed pattern application of arrays of interlocking filament bundles. For example, the arrays can be disposed in other intermittent patterns e.g. sinusoidal to a storage tank with an effective separating material positioned on the remaining uncovered areas.

Figure 13:
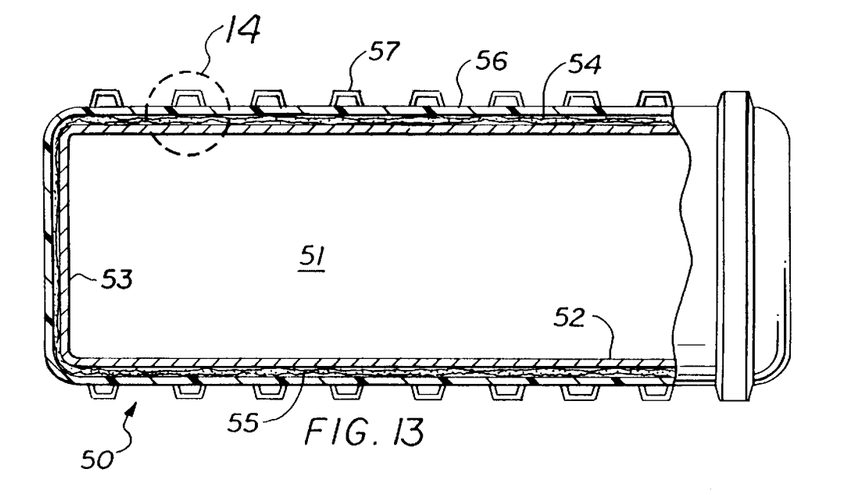
FIG. 13 is a side view in partial section of another double walled storage tank system of the invention having a steel inner tank and a continuous outer wall of fibrous reinforced resinous material substantially covering the inner tank with circumferentially extending support ribs.
Figure 14:
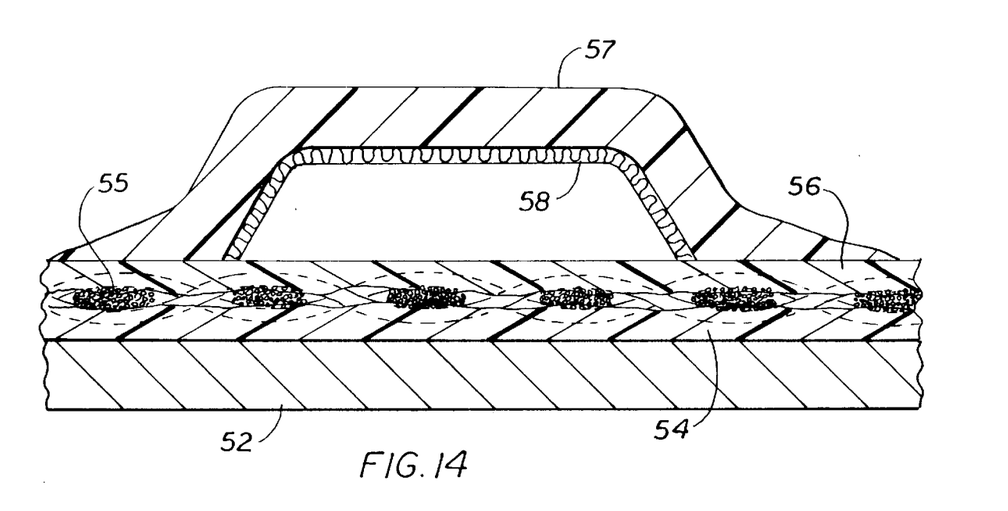
FIG. 14 is an enlarged partial side view in section of the double walled storage tank system of FIG. 13 taken along line 14—14 thereof.

With reference to FIGS. 13 and 14, there is shown an embodiment of the invention wherein outer support ribs are used to further enhance the structural strength of the double walled storage tank system 50. A steel inner tank 51 is used in the system. It has a cylindrical-shaped main body side wall 52 and flat end walls 53. A resinous material 54 is applied to the inner tank and effectively becomes a part of that wall. Next, an array 55 of interlocking filament bundles is embedded in the resinous material 54 while still tacky in a manner similar to that described in FIGS. 1–5. The continuous wall 56 is formed over the array 55 and, in accord with this embodiment of the invention, a set of circumferentially extending support ribs 57 are positioned on the continuous wall 56 and secured thereto. Preferably, the ribs are uniformly spaced and have on-center spacings ranging from about six inches to about twenty-four inches.

The support ribs are conventional in nature. They are typically formed by positioning a rib form 58 on the continuous wall 56 and then applying fibrous reinforced resinous material in sufficient thickness to create a rigid structure securely attached to the continuous wall. As shown, the fibrous reinforced resinous material overlaps onto the continuous wall. The support ribs can also be formed from foam molds which are hollow or solid. As with the cardboard forms, the foam molds are positioned around the continuous wall and fibrous reinforced resinous material applied. In all instances, the resultant ribs are rigid and are permanently attached to the continuous wall 56 of the double walled storage tank system 50.

Figure 15:
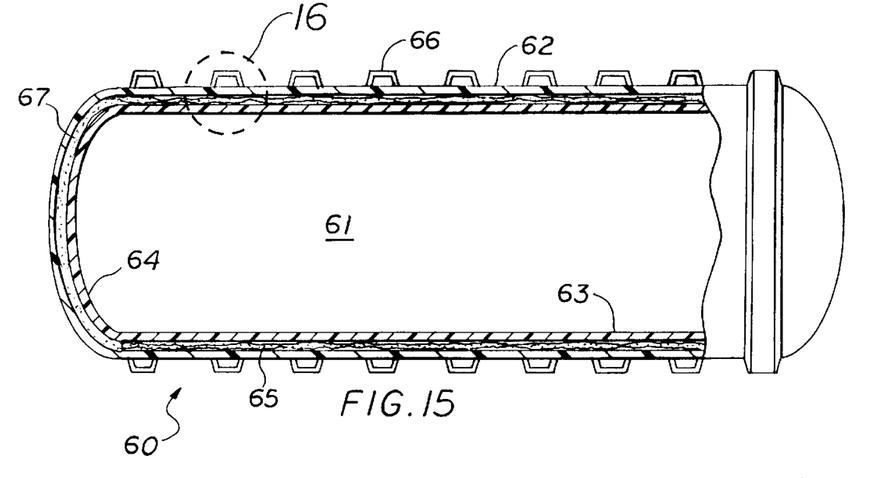
FIG. 15 is a side view in partial section of still another double walled storage tank system of the invention having an inner tank and a continuous outer wall each of fibrous reinforced resinous material with circumferentially extending support ribs.
Figure 16:
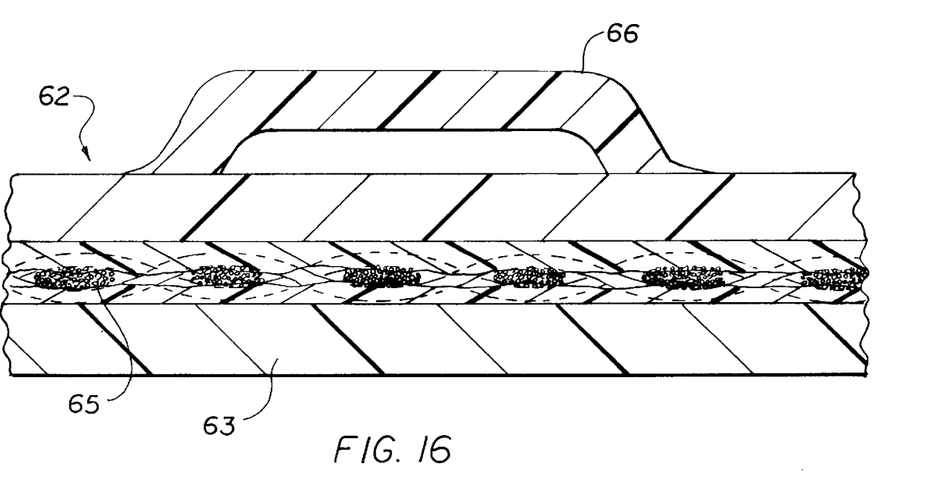
FIG. 16 is an enlarged partial side view in section of the double walled storage tank system of FIG. 15 taken along line 16—16 thereof.

FIGS. 15 and 16 illustrate a double walled storage tank system 60 of the invention wherein both the inner tank 61 and the outer continuous wall 62 are made of a fibrous reinforced resinous material. The inner tank 61 has a cylindrical-shaped main body side wall 63 and dome-shaped end walls 64. In accord with the invention, an array 65 of interlocking filament bundles substantially covers only the side walls. The domed-shaped end walls are covered with a separating material 67 to prevent adherence of the inner tank 61 to the outer continuous wall 62. Use of the separating material in the end walls speeds up production time and is preferred for this reason. The continuous wall 62 is formed over the array 65 and also substantially covers the inner tank's side wall 63 and end walls 64. Additionally, and for the reason discussed above with reference to FIGS. 13 and 14, a set of support ribs 66, preferably uniformly spaced, extend around the continuous wall 62 and are bonded thereto. As shown, each support rib 66 extends circumferentially around the continuous wall. There could also be used a single spiral-shaped support rib which extends the length of the continuous wall.

The tank system 60 is made using known tank building techniques readily adapted to use the herein described arrays. For example, a reuseable mold is initially used to form two half tanks which are subsequently removed from the molds and joined together. The array is added to its outer surface, the continuous wall formed and the support ribs added. The tank system could as well be built from outside in using known tank building techniques.

As best seen in FIG. 16, the side wall 63 of the inner tank is initially given a thin resinous coating and, while still tacky, a first face of the array 65 is embedded therein. Next, a resinous material is applied to a second face of the array 65 to partially penetrate into it and is cured. A relatively thick application of resinous material and fibrous reinforcing material (separately cross-hatched for illustration purposes only) is then applied and cured. The continuous wall 62 comprises the resin layer which extends partially into the array's second face and the fibrous reinforced resinous material which is formed thereon.

Figure 17:
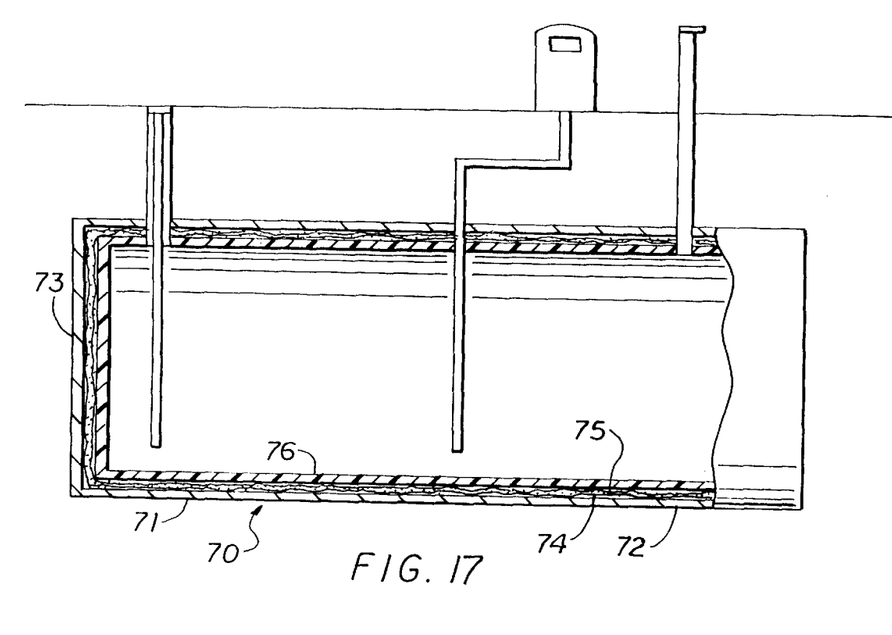
FIG. 17 is a side view in partial section of a double walled storage tank system wherein a buried steel tank is retrofitted with an inner continuous wall in accordance with the invention.
Figure 18:
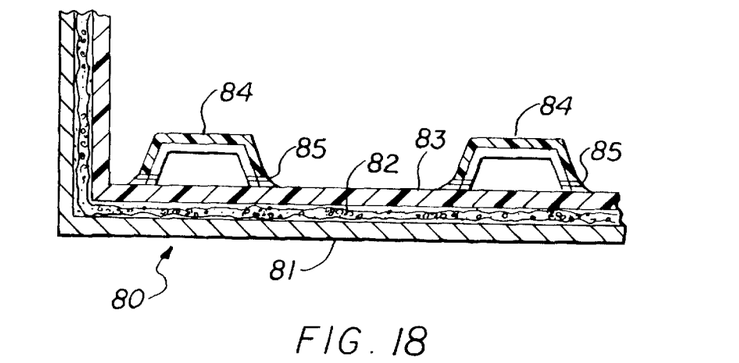
FIG. 18 is an enlarged partial side view in section of still another double walled storage tank system of the invention with a steel tank having an inner continuous wall and internal support ribs made in accord with this invention.

The embodiments of this invention illustrated in FIGS. 17 and 18 utilize an existing underground storage tank as a matrix tank in forming a double walled storage tank system. The matrix tank is a metal tank or a fibrous reinforced resinous tank having a cylindrical-shaped main body and end caps. The end caps shown are flat, though can as well be dome-shaped. Such tanks represent a very conventional design. Each will have typically been field tested to ascertain a leakage problem which needs to be rectified. Any major corrosion damage or crack in the matrix tank can first be repaired, though need not be. The method of this invention lends itself particularly well to the formation of an in situ storage tank system in an existing buried tank which is in need of rejuvenation. The resultant formed inner tank is fully capable of independently containing liquid. When internal support ribs are added as shown in FIG. 18, the formed inner tank is also independently capable of withstanding normal load forces.

With reference to FIG. 17, there is shown an in situ formed double walled storage tank system 70 of the invention. The continuous wall of the system is formed inside an existing matrix tank 71. The matrix tank 71 comprises a cylindrical-shaped main body side wall 72 and end walls 73. The main body 72 and end walls 73 are made of metal, preferably steel. The interior of the matrix tank is a smooth walled cylindrical-shaped container. In this embodiment, any sludge or other contaminate material is initially removed from the matrix tank 61. Preferably, the entire interior surface of the tank is abrasively cleaned by sand-blasting to remove foreign substances and to roughened the surface to better serve as a temporary surface while, as further discussed below, an array of interlocking filament bundles is bonded thereto and a continuous wall is formed. Any access lines such as used for filling, dispensing and venting purposes are temporarily disconnected and any openings capped or masked over.

A liquid resinous material 74 is initially applied to fully cover the interior surface of the cylindrical-shaped main body side wall 72 and end walls 73 of the matrix tank 71. The resinous material described above are used. Its viscosity is adjusted so that after its application to the matrix tank walls and prior to cure, an array 75 of interlocking filament bundles can be laid thereon and only partially embedded. Next, an inner continuous wall 76 comprised of a cylindrical-shaped main body and end walls are formed so as to follow the contour of the matrix tank's interior walls. The continuous wall 76 is also made from a resinous material. The portion of the continuous wall away from the array can contain fibrous material. The fibrous material when used is of the same physical shape and structure as described above as is the resinous material. There are several known ways of producing a structurally sound continuous wall of resinous and fibrous materials. The particular way selected is not important.

FIG. 18 is another in situ formed double walled storage tank system 80 of the invention. It has a steel outer tank 81, an array 82 of interlocking filament bundles, and an inner continuous wall 83 formed as above described with respect to FIG. 17. Additionally, internal support ribs 84 extend circumferentially around the inside of the tank. The support ribs 84 are positioned around the inside of the cylindrical-shaped main body portion of the continuous wall 83 and are secured thereto. The support ribs 84 are preferably uniformly spaced along the wall and protrude inwardly. A centerline spacing of from about four inches to about thirty inches is preferred. A closer spacing tends to result in a stronger tank, though the added costs may not be justified. The support ribs 84 made of a fibrous reinforced resinous material are typically formed in a manner described above with reference to FIGS. 13 and 14.

The internal support ribs of the double walled storage tank system 80 add strength needed to withstand earth load stresses. Such ribs when properly formed and secured to the cylindrical-shaped continuous wall 83 results in a storage tank which is capable of withstanding load forces normally encountered. The formed tank has sufficient strength without any strengthening contribution from the matrix tank.

Each internal support rib 84 of the double walled storage tank system shown in FIG. 18 has apertures 85 extending through both side walls at or near a lowermost point in the formed tank. The purpose of the apertures is to allow stored liquid to flow freely to avoid pools of liquid between the ribs. Apertures in the support ribs at an uppermost point (not shown) are also beneficial in that they allow vapors to flow freely to avoid trapped vapors when the tank is substantially full. While not shown, a smooth continuous innermost wall can be installed at least on top of the internal support ribs 84 at the ribs' lowest point in the formed tank. At least about 10% of the support ribs' top surface area is covered by the innermost wall. The purpose of this wall is to provide a smooth bottom whereby stored liquid is readily accessed for dispensing purposes. The innermost wall can as well extend completely around the inside of the tank system to fully cover the support ribs.

Figure 19:
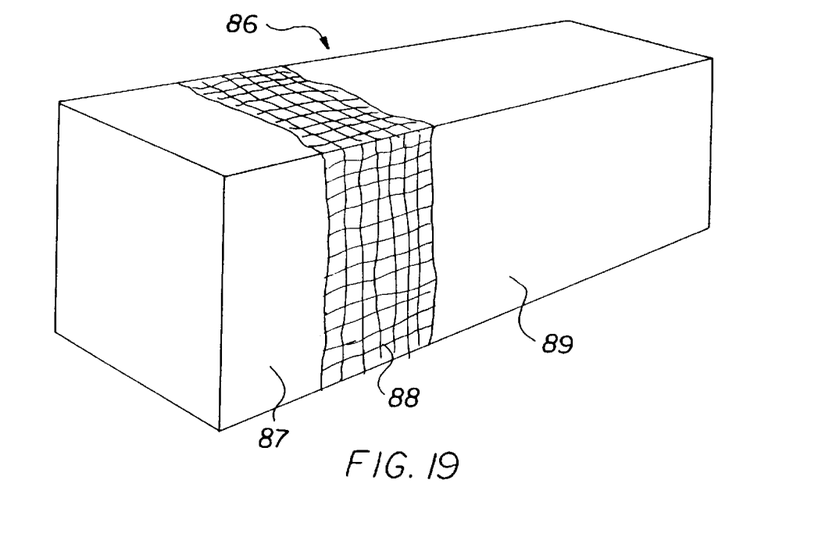
FIG. 19 is a view in perspective of an above ground double walled storage tank system of the invention having flat side walls and flat end caps.

FIG. 19 illustrates a double walled storage tank system 86 of the invention which has a rectangular-shaped inner tank 87 with flat side walls and end walls. An array 88 of interlocking filament bundles and an outer continuous wall 89 of resinous material, optionally fibrous reinforced, substantially fully cover the inner tank. The tank system 86 is particularly suited as an above ground storage tank system which can be further encased in concrete and used at retail gasoline service stations.

Figure 20:
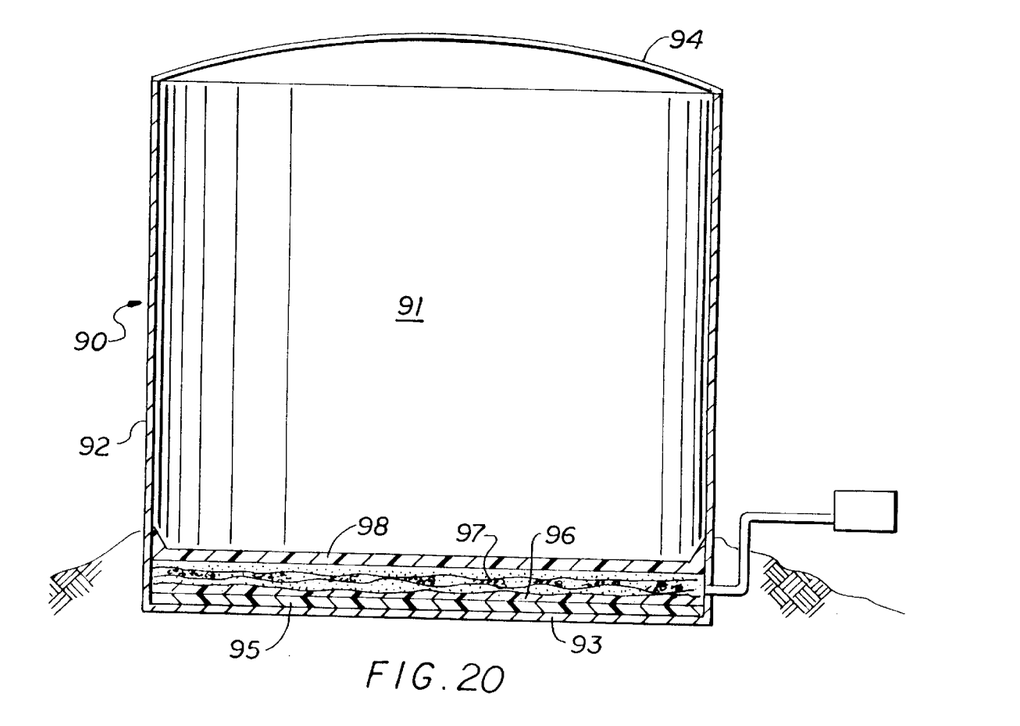
FIG. 20 is an above ground vertically disposed double walled storage tank system of the invention.

With reference to FIG. 20, there is shown an above ground storage tank system 90 of the invention. A storage tank 91 forming a part of the system is made of metal and has a cylindrical-shaped side wall 92, a flat bottom wall 93 and a generally domed-shaped top wall 94. The top wall 94 as shown is permanently attached to the side wall. Floating top walls which rest of the stored liquid are also commercially available and feasible in this invention. Inlet and outlet piping as well as a manway in the top or side wall which are typically present are not shown. The invention is useful with storage tanks made of other rigid materials, particularly fibrous reinforced resinous material. Other shapes of tanks also utilize the invention. However, this embodiment of the invention is particularly suited to the metal cylindrical-shaped tanks having the flat bottom wall and, for this reason, is described in detail.

The storage tank 91 is commercially available. Such tanks are available in capacities holding at least about 10,000 gallons of liquid. An optional liner 95 is initially added across the flat bottom wall 93 and secured thereto, at least at its edges. The liner 95 is particularly useful with used storage tanks which are in need of repair or with new tanks where an added measure of bottom wall integrity is desired. The liner 95 is a material which is resistant to the liquid being stored. Examples of suitable liners include materials made of polyepoxies, polyesters, vinylesters and polyurethanes. Other examples include synthetic resins which are capable of being sprayed, trowelled or poured onto the bottom wall and cured.

A resinous material 96 and an array 97 of interlocking filament bundles as above described are next added over the storage tank's flat bottom wall, including any optional liner, and preferably partially up its side wall. An inner continuous wall 98 of FIG. 20 is made of a resinous material, preferably reinforced with a fibrous material. It is formed by applying a layer of the resinous and fibrous reinforcing materials on the array 87 in the manner discussed above.

It should be apparent the tank systems of the invention lend themselves to effective monitoring. Any type of failure in the tank wall or the continuous wall adjacent the closed communication space will be readily detected. Stored liquid, ground water or a change in gaseous content or pressure is detectable regardless of where the failure may have occurred. Even the approximate location of a wall failure is determinable when two or more closed communication spaces are created. For example, an annular closed communication space can be structurally isolated from a planar closed communication space as exists between an end wall and its overlying continuous wall.

The tank systems of the invention are adaptable to enhanced leak detection by the use of independent open flow channel means positioned in close association with a tank wall. For example, a tube with receiving holes in its wall or a half-round tube can be installed adjacent a tank wall or continuous wall at one or more strategic locations to detect some change in the local environment. The tube can extend along the top of the storage tank wall and connect into the end cap areas. Additional apertured tubes can extend along the bottom of the storage tank and optionally sides of the storage tank and all be interconnected to speed the detection of a leak. The apertured tubes are preferably connected to a reservoir as described above and in U.S. Pat. No. 4,936,705. Alternatively, the apertured tubes are connected to a collection area which is accessed by a probe to detect stored liquid or ground water. Any change is immediately transmitted to a monitoring station. Other open flow channel means such as strips of porous material, e.g. an open cell foam can be used in conjunction with the closed communication space provided in the array of interlocking filament bundles to result in a tank system with the capability of alerting its owner to a leakage problem soon after the problem comes into being.

As a general rule, the thinner the array of interlocking filament bundles, the smaller the unbonded mid-portions thereof. Consequently, the communication time within the mid-portion of the array is slowed and there is a greater need for the independent open flow channels as described above. Four horizontal open flow channels extending substantially equi-spaced along the storage tank wall can optionally be used. All preferably are interconnected and lead to a monitoring station.

The invention has been described with particular reference to the drawings. Variations of the invention of an obvious nature are considered within the scope of the appended claims.

What is claimed is:

1. A double walled storage tank system having two closely associated discreet walls held together in a manner which creates a closed communication space, said storage tank system comprising:
   (a) a tank;
   (b) an overlying continuous wall of a resinous material closely associated with at least a portion of the tank; and
   (c) an array of interlocking filament bundles disposed between the tank and the overlying continuous wall, wherein each of the filament bundles in the array is from about 2 mm to about 12 mm in width and about 2 mm to about 12 mm in thickness, and whereby a first face of the array is bonded to the tank, a second face of the array is bonded to the continuous wall and a mid-portion of the array is in a substantially unbonded state to provide a closed communication space for the detection of any leakage through a wall, wherein the bonding of the array of interlocking filament bundles to the walls and the inherent strength of the array of interlocking filament bundles hold the tank wall and the continuous wall together.

2. A double walled storage tank system having a closed communication space between two closely associated discreet walls, said storage tank system comprising:
   (a) a tank having a main body side wall and attached end walls at each end thereof;
   (b) a continuous wall of a resinous material which substantially follows the contour of at least a portion of the tank; and
   (c) an array of interlocking filament bundles disposed between the tank and the continuous wall, wherein each of the filament bundles in the array is from about 2 mm to about 12 mm in width and about 2 mm to about 12 mm in thickness, and whereby a first face of the array is bonded to the tank, a second face of the array is bonded to the continuous wall and a mid-portion of the array is in a substantially unbonded state to provide a closed communication space for the detection of any leakage through a wall, wherein the bonding of the array of interlocking filament bundles to the walls and the inherent strength of the array of interlocking filament bundles hold the tank wall and the continuous wall together sufficiently so as to withstand pressure within said closed communication space.

3. The double walled storage tank system of claim 2 wherein the array of interlocking filament bundles is formed from bundles of fiberglass filaments.

4. The double walled storage tank system of claim 3 wherein the array of interlocking filament bundles has a basket weave.

5. The double walled storage tank system of claim 2 wherein each of the filament bundles in the array of interlocking filament bundles is from about 4 mm to about 8 mm in width and about 2 mm to about 5 mm in thickness.

6. The double walled storage tank system of claim 2 wherein the array of interlocking filament bundles has a yield of from about 8 oz. per square yard to about 54 oz. per square yard.

7. The double walled storage tank system of claim 2 wherein the tank is formed from a fibrous reinforced resinous material and further has a set of spaced support ribs positioned on the main body side wall.

8. The double walled storage tank system of claim 2 wherein the tank is formed from steel.

9. The double walled storage tank system of claim 2 wherein the continuous wall follows the contour of the outside of the tank.

10. The double walled storage tank system of claim 2 wherein the continuous wall follows the contour of the inside of the tank.

11. The double walled storage tank system of claim 9 further wherein the tank has a cylindrical-shaped main body side wall and further has a set of substantially uniformly spaced support ribs positioned on the continuous wall overlying said cylindrical-shaped main body side wall of the tank and extending circumferentially therearound.

12. The double walled storage tank system of claim 2 wherein the array of interlocking filament bundles is disposed between the main body side wall of the tank and the continuous wall thereover.

13. The double walled storage tank system of claim 2 wherein the array of interlocking filament bundles is disposed between each end wall of the tank and the continuous wall thereover.

14. The double walled storage tank system of claim 2 wherein the array of interlocking filament bundles is disposed over a lower about 270 degree to about 340 degree portion of the main body side wall.

15. The double walled storage tank system of claim 2 wherein the array of interlocking filament bundles is disposed substantially over the main body side wall and the end walls of the tank and the continuous wall follows the contour of said main body side wall and said end walls.

16. A double walled storage tank system having a closed annular space between two closely associated discreet walls for detection of leakage resulting from damage to a wall, said storage tank system comprising:

(a) a storage tank having a cylindrical-shaped main body side wall and attached end walls at each end thereof;

(b) a continuous wall of a resinous material which substantially follows the contour of each end wall of the storage tank; and (c) an array of interlocking filament bundles disposed between each attached end wall of the storage tank and each of the continuous walls lying thereover, wherein each of the filament bundles in the array is from about 2 mm to about 12 mm in width and about 2 mm to about 12 mm in thickness, and whereby a first face of each array is securely bonded to the tank, a second face of each array is securely bonded to the continuous wall and a mid-portion of each array is in a substantially unbonded state to provide a closed communication space so as to allow the detection of any leaked liquid or air and further wherein each said array has sufficient strength to hold the tank end walls and the continuous walls together.

17. The double walled storage tank system of claim 16 wherein the array of interlocking filament bundles has a yield of from about 8 oz. per square yard to about 54 oz. per square yard.

18. The double walled storage tank system of claim 17 wherein the array of interlocking filament bundles has a yield of from about 24 oz. per square yard to about 48 oz. per square yard and further has a basket weave.

19. The double walled storage tank system of claim 16 wherein the tank is formed from steel.

20. A double walled storage tank system having cylindrical-shaped walls structurally bonded together in a defined intermittent manner whereby flow channels are created, said system comprising:

(a) a tank having a cylindrical-shaped main side body and having an end wall attached at each end thereof;

(b) a continuous wall which covers at least a portion of the cylindrical-shaped main body side wall of the tank; and (c) an array of interlocking filament bundles between the tank and the continuous wall in a defined pattern, wherein each of the filament bundles in the array is from about 2 mm to about 12 mm in width and about 2 mm to about 12 mm in thickness, and whereby a first face of the array is bonded to the tank and a second face of the array is bonded to the continuous wall to create a closed communication space between the walls thereby forming flow channels extending substantially the full length of the cylindrical-shaped main body such that leakage through the tank or the continuous wall is capable of being detected.

21. The double walled storage tank system of claim 20 wherein the defined pattern is a spiral pattern.

22. The double walled storage tank system of claim 20 wherein the array of interlocking filament bundles has a yield of from about 8 oz. per square yard to about 54 oz. per square yard.

23. The double walled storage tank system of claim 22 wherein the array of interlocking filament bundles has a yield of from about 24 oz. per square yard to about 48 oz. per square yard and further has a basket weave.

24. A double walled storage tank system having a closed communication space between two closely associated discreet walls for the detection of leakage resulting from damage to a wall, said storage tank system comprising:

(a) a storage tank having a cylindrical-shaped main body side wall and attached end walls at each end thereof;

(b) a continuous wall of a resinous material which substantially follows the contour of the storage tank to substantially cover said tank with an annular space therebetween; and (c) an array of interlocking filament bundles disposed between the storage tank and the continuous wall, wherein each of the filament bundles in the array is from about 2 mm to about 12 mm in width and about 2 mm to about 12 mm in thickness, and whereby a first face thereof is bonded to the wall of the storage tank, a second face thereof is bonded to the continuous wall and a mid-portion thereof is in a substantially unbonded state to provide a closed annular communication space so as to allow the detection of any leakage and further wherein the array has sufficient strength to hold the tank walls and the continuous wall together.

25. The double walled storage tank system of claim 24 wherein the array of interlocking filament bundles has a yield of from about 8 oz. per square yard to about 54 oz. per square yard.

26. The double walled storage tank system of claim 25 wherein the array of interlocking filament bundles has a yield of from about 24 oz. per square yard to about 48 oz. per square yard and further has a basket weave.

27. The double walled storage tank system of claim 24 wherein the continuous wall follows the contour of the outside of the tank.

28. The double walled storage tank system of claim 24 wherein the continuous wall follows the contour of the inside of the tank.

29. A double walled storage tank system having a closed communication space between two closely associated discreet walls for the reception of leakage resulting from damage to a wall, said storage tank system comprising:

(a) a matrix tank having a cylindrical-shaped main body side wall and attached end walls at each end thereof;

(b) a continuous wall of a resinous material which substantially follows the interior contour of the matrix tank and covers at least a portion thereof; and (c) an array of interlocking filament bundles disposed between the matrix tank and the continuous wall, wherein each of the filament bundles in the array is from about 2 mm to about 12 mm in width and about 2 mm to about 12 mm in thickness, and whereby a first face thereof is securely bonded to the tank, a second face thereof is securely bonded to the continuous wall and a mid-portion thereof is in a substantially unbonded state to provide a closed annular communication space so as to allow the detection of any leakage therethrough and further wherein the array has sufficient tensile strength to hold the matrix tank walls and the continuous wall together.

30. The double walled storage tank system of claim 29 wherein the array of interlocking filament bundles has a yield of from about 8 oz. per square yard to about 54 oz. per square yard.

31. The double walled storage tank system of claim 30 wherein the array of interlocking filament bundles has a yield of from about 24 oz. per square yard to about 48 oz. per square yard and further has a basket weave.

32. The double walled storage tank system of claim 29 wherein the matrix tank is formed from a fibrous reinforced resinous material.

33. The double walled storage tank system of claim 29 wherein the matrix tank is formed from steel.

34. The double walled storage tank system of claim 33 further wherein a set of substantially uniformly spaced support ribs are positioned on the continuous wall overlying said cylindrical-shaped main body wall of the tank and extend circumferentially therearound.

35. A double walled storage tank system having a closed communication space between two closely associated discreet walls for the detection of leakage resulting from damage to a wall, said storage tank system comprising:

(a) a storage tank having a cylindrical-shaped main body side wall and attached end walls at each end thereof;

(b) a continuous wall of a fibrous reinforced resinous material which substantially follows the contour of the interior of the storage tank;

(c) an array of interlocking filament bundles disposed between the tank and the continuous wall, wherein each of the filament bundles in the array is from about 2 mm to about 12 mm in width and about 2 mm to about 12 mm in thickness, and whereby a first face thereof is securely bonded to the wall of the tank, a second face thereof is securely bonded to the continuous wall and a mid-portion thereof is in a substantially unbonded state to provide a closed annular communication space so as to allow the detection of any leakage therethrough and further wherein the array has sufficient strength to hold the tank walls and the continuous wall together; and (d) a set of internal support ribs securely bonded to the continuous wall overlying the storage tank's cylindrical-shaped main body wall.

36. The double walled storage tank system of claim 35 wherein the array of interlocking filament bundles has a yield of from about 8 oz. per square yard to about 54 oz. per square yard.

37. The double walled storage tank system of claim 36 wherein the array of interlocking filament bundles has a yield of from about 24 oz. per square yard to about 48 oz. per square yard and further has a basket weave.

38. The double walled storage tank system of claim 35 wherein the tank is formed from steel.

39. A double walled storage tank system having a closed communication space between two closely associated discreet walls for the detection of leakage resulting from damage to a wall, said storage tank system comprising:

(a) a storage tank having a rectangular-shaped main body side wall and attached end walls at each end thereof;

(b) a continuous wall of a resinous material which substantially follows the contour of the storage tank to substantially cover said tank with an annular space therebetween; and (c) an array of interlocking filament bundles disposed between the storage tank and the continuous wall, wherein each of the filament bundles in the array is from about 2 mm to about 12 mm in width and about 2 mm to about 12 mm in thickness, and whereby a first face thereof is bonded to the wall of the storage tank, a second face thereof is bonded to the continuous wall and a mid-portion thereof is in a substantially unbonded state to provide a closed annular communication space so as to allow the detection of any leakage and further wherein the array has sufficient strength to hold the tank walls and the continuous wall together.

40. The double walled storage tank system of claim 39 wherein the array of interlocking filament bundles has a yield of from about 8 oz. per square yard to about 54 oz. per square yard.

41. The double walled storage tank system of claim 40 wherein the array of interlocking filament bundles has a yield of from about 24 oz. per square yard to about 48 oz. per square yard and further has a basket weave.

42. The double walled storage tank system of claim 39 wherein the continuous wall follows the contour of the outside of the tank.

43. An above ground double walled storage tank system having a closed space between two closely associated discreet walls for detection of leakage resulting from damage to a wall, said storage tank system comprising:

(a) a storage tank having a cylindrical-shaped main body side wall and a substantially flat bottom wall;

(b) a continuous wall of a resinous material which substantially follows the contour of at least the substantially flat bottom wall of the storage tank; and (c) an array of interlocking filament bundles disposed between the flat bottom wall of the tank and the continuous wall, wherein each of the filament bundles in the array is from about 2 mm to about 12 mm in width and about 2 mm to about 12 mm in thickness, and whereby a first face thereof is securely bonded to the tank flat bottom wall, a second face thereof is securely bonded to the continuous wall and a mid-portion thereof is in a substantially unbonded state to provide a closed communication space so as to allow the detection of any leakage therethrough and further wherein the array has sufficient strength to hold the flat bottom wall and the continuous wall together.

44. The double walled storage tank system of claim 43 wherein the array of interlocking filament bundles has a yield of from about 8 oz. per square yard to about 54 oz. per square yard.

45. The double walled storage tank system of claim 44 wherein the array of interlocking filament bundles has a yield of from about 24 oz. per square yard to about 48 oz. per square yard and further has a basket weave.

46. The double walled storage tank system of claim 43 wherein the tank is formed from steel.

\* \* \* \* \*